(No Model.) 3 Sheets—Sheet 1.
L. U. LOOMIS.
WIND WHEEL GEARING.
No. 336,651. Patented Feb. 23, 1886.
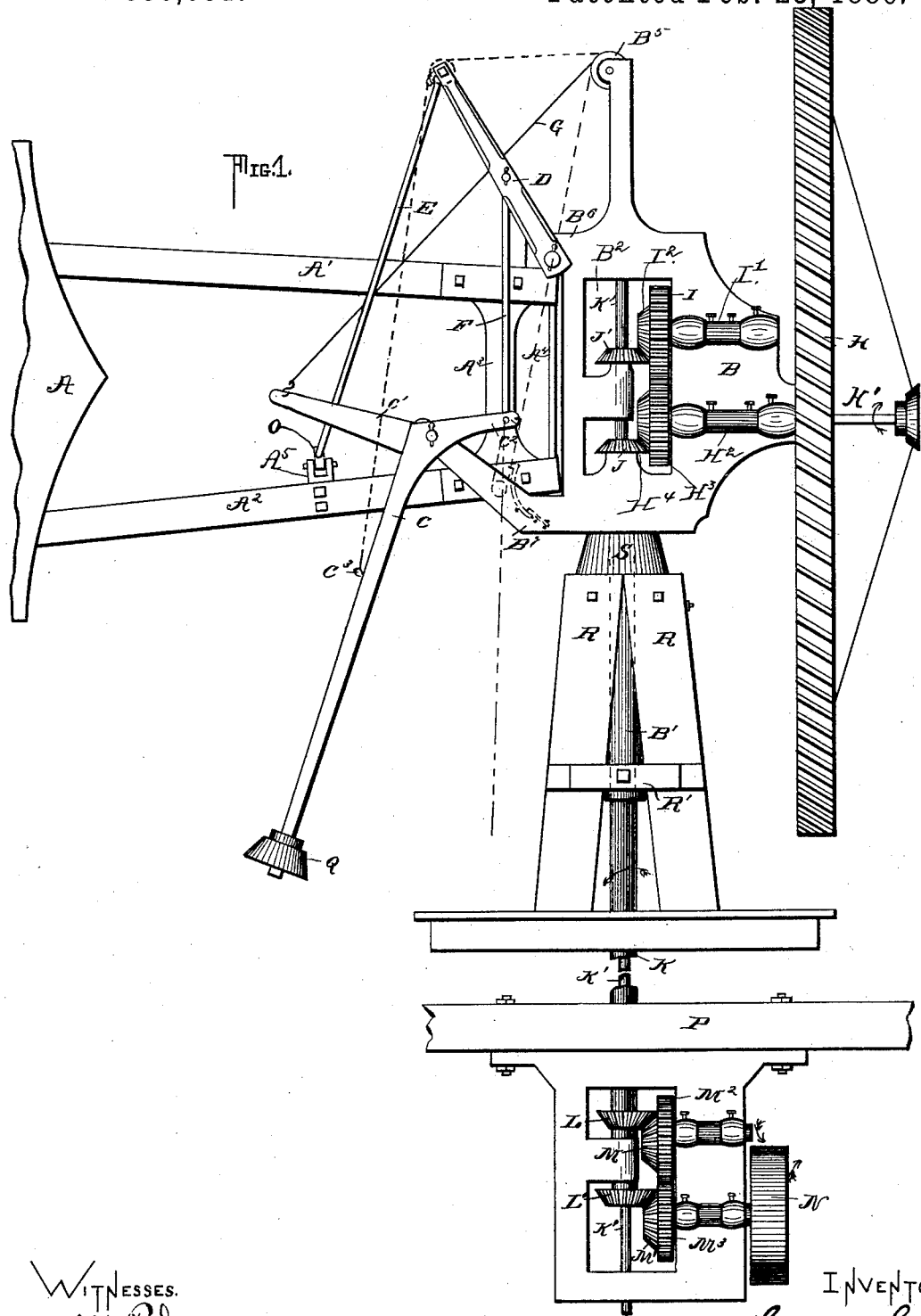
Witnesses.
Wm Rheem.
R. W. Bishop.
Inventor.
Lyman U. Loomis
By R.S. & A.P. Lacey
Atty.

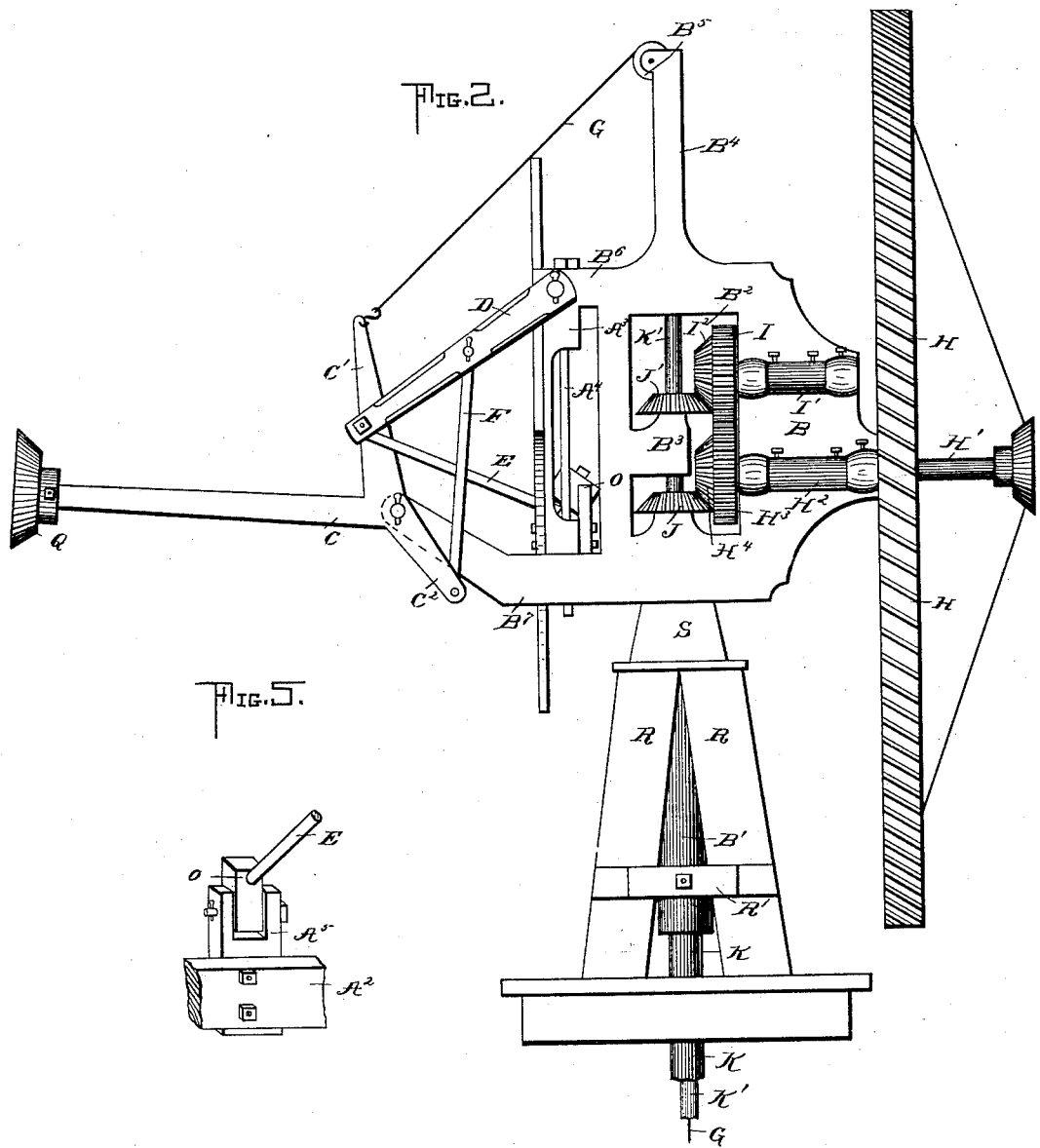

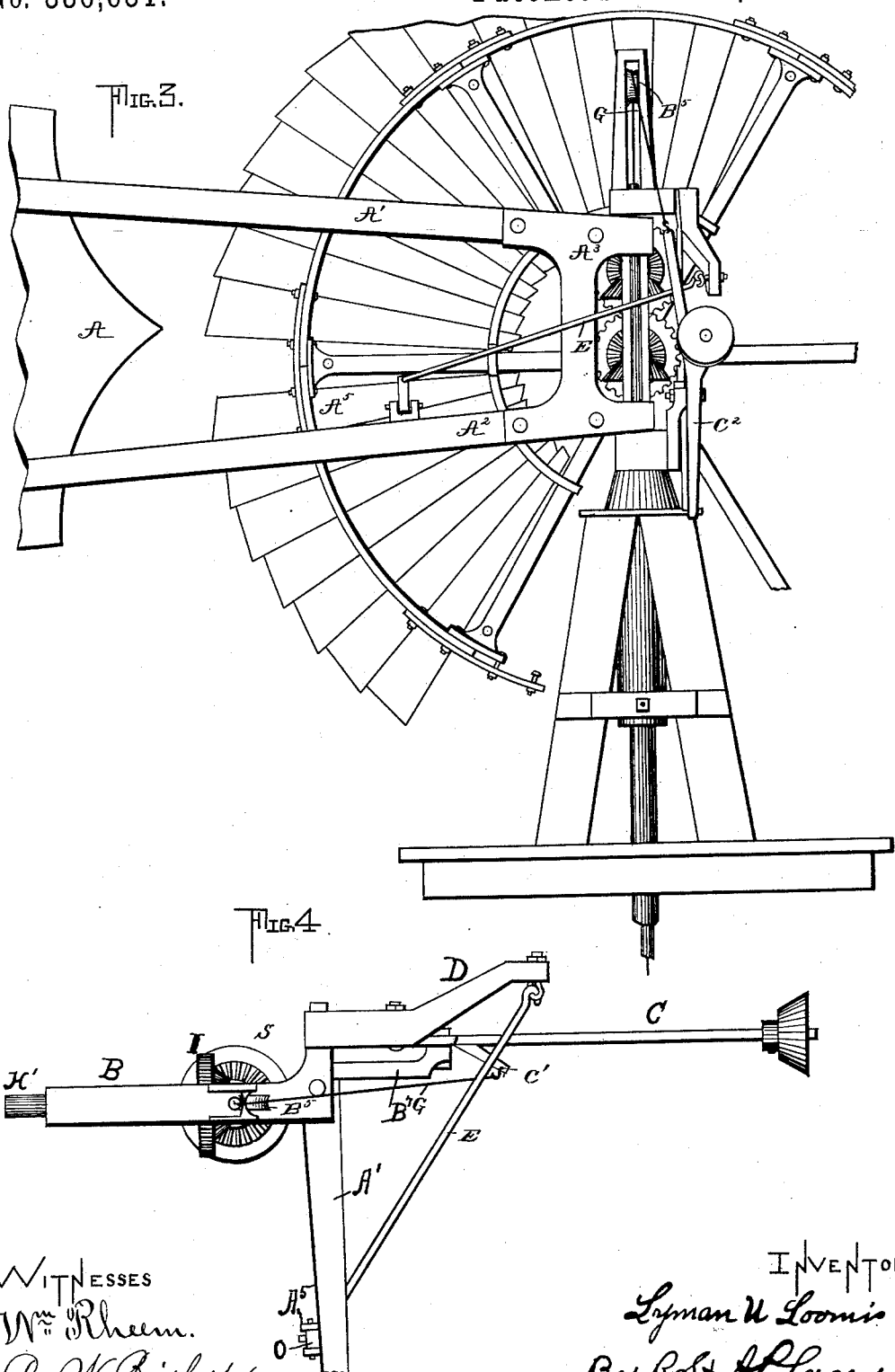

UNITED STATES PATENT OFFICE.

LYMAN U. LOOMIS, OF McPHERSON, KANSAS.

WIND-WHEEL GEARING.

SPECIFICATION forming part of Letters Patent No. 336,651, dated February 23, 1886.

Application filed September 7, 1885. Serial No. 176,401. (No model.)

*To all whom it may concern:*

Be it known that I, LYMAN U. LOOMIS, a citizen of the United States, residing at McPherson, in the county of McPherson and State of Kansas, have invented certain new and useful Improvements in Wind-Wheel Gearing; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to improvements in that class of wind-wheels known as "solid wheels;" and it consists in the construction, combination, and arrangement of parts hereinafter described, and specifically pointed out in the claims.

In the drawings, Figure 1 is an elevation showing the wheel in the wind. Fig. 2 is an elevation with the wheel out of the wind. Fig. 3 is a rear elevation showing part of the wheel and the vane turned so as to throw the wheel out of the wind. Fig. 4 is a plan of the main frame and some of the operating parts attached thereto; and Fig. 5 is a detail of the swivel-joint to which the rod for turning the vane is attached.

B is the main frame or casting, suitably constructed and adapted to carry the several parts of my invention. It is provided with a depending tubular extension, B', which passes through the hollow support S, which is fixed upon and forms the top of the tower R. The frame B turns on the support S. The lower end of the tubular extension B' is supported by and turns in a boxing, R', secured in the tower.

The frame is formed so as to provide the opening $B^2$, within which the several operating-gears are arranged, and it is also provided with suitable openings to receive and permit the revolution of the several shafts hereinafter described. An arm, $B^3$, is projected into the opening $B^2$, and is provided with a vertical tubular shaft-opening, and a standard, $B^4$, provided with a pulley, $B^5$, is projected upward in line with the shaft-bearings.

The wind-wheel H has its shaft H' journaled in bearings formed in or fixed on the frame B. I prefer to employ boxing $H^2$, arranged on the side of the frame and fixed thereto by any well-known methods, so that it may be removed when desired. On the inner end of the wheel-shaft, and within the opening $B^2$, a spur-gear, $H^3$, is fixed, and on the side of the spur-gear a miter-gear, $H^4$, is fixed, which meshes with a miter-gear, J, fixed on the upper end of the outer tubular shaft, K. The spur-gear $H^3$ meshes with a spur-gear, I, which has its shaft journaled in a boxing, I', which may be removable in like manner as the boxing $H^2$. A miter-gear, $I^2$, is fixed on the side of the gear I, and meshes with the miter-pinion J' on the tubular shaft K', which revolves in the outer shaft, K. By the arrangement of the several gears, as hereinbefore described, the shafts K K' are made to revolve in opposite directions, and the compactness with which the gearing is arranged gives to the shaft the steadiest possible movement.

The shafts K and K' are tubular. The smaller shaft, K', passes down through and projects below the end of the larger shaft, K, and both have their lower ends provided with miter-gears L and L', which mesh with the gearing M M' and impart motion to the spur-gears $M^2$ $M^3$, and through these impart a rotary motion to the band-wheel N, which is designed to impart motion to the other machinery.

The vane A is preferably supported by two arms, A' $A^2$, which are firmly held in a bracket, $A^3$, pivoted on a rod, $A^4$, held in arms $B^6$ $B^7$, projected from the frame B. The vane could be supported by a single arm; but I prefer two arms, as shown, because thereby greater strength is secured with less weight of material. On the arm $A^2$ a bracket, $A^5$, is fixed, which is adapted to hold a block, O, which is pivoted to turn readily, for purposes hereinafter set forth.

A lever, C, provided with arms C' $C^2$, projected outward at nearly right angles to the lever, is pivoted on the outer end of the arm $B^7$, which is extended, as shown. On the outer end of the lever a weight, Q, is placed, and is held so that it may be adjusted along the lever and fixed at any desired point.

To the outer end of the arm C' one end of a cord or chain, G, is attached. The other end thereof is carried upward and over the pulley B⁵, and thence downward through the inner shaft, K', to any suitable place where it can be taken hold of by the hand. By this cord or chain the lever C can be raised and the vane be thrown parallel with the wheel, as hereinafter explained. The outer end of the opposite arm, C², is pivoted at one end of a coupling-rod, F, the other end of which is pivoted on an arm, D, intermediate the ends thereof.

The arm D has one end pivoted on the frame B, and at its opposite or free end a rod, E, is pivoted. The opposite end of the rod E is bent at an angle and held in a bearing in the tilting block O, as shown. The arms of the lever C and the arm D are so formed by bending them laterally that they will not interfere with any other mechanism when different positions are given to the vane.

The operation of this machine will be apparent to any one acquainted with the construction of wind-wheels. When the wheel is in the wind, the several parts will be in the several positions shown in Fig. 1. The vane is thrown to one side by raising the lever C by means of the cord or chain G. The vane being turned to the position shown in Figs. 2 and 3, the wheel will then be turned out of the wind, and the lever C, with its arms D, and the rods E and F will assume the position shown in said figures. The cord or chain G is preferably passed through the hollow shaft, as shown; but such disposition is not absolutely necessary. The cord could be carried down on the outer side of the frame, as in ordinary wind-wheels. Again, one end of the cord could be attached to the end of the arm C² and its other end hang down, so that it could be taken hold of by the hand. While these several dispositions of the cord can be made and very excellent results obtained, I prefer the specific arrangement shown. Again, the lever could be raised by any of the well-known means, and could be securely held in position by a catch arranged on the arm B⁷ and adapted to engage the arm C². The catch could be disengaged by any suitable means.

The arm C' of the lever C can be dispensed with. If the lever C were constructed without this arm, the cord G could be carried down alongside the frame and under a pulley fixed on the arm, B⁷, and thence up and be connected to the end of the arm C². This arrangement would require more power to be exerted on the cord to raise the lever; but very good results would be accomplished thereby. Another arrangement would be to place a pulley on the end of the lever or arm D, pass the cord over it and down to an eye, C³, or other suitable device on the lever C. I prefer the specific construction shown, as thereby the lever is more easily raised.

The end of the rod E could be connected to the arm of the vane by a simple eye or staple, or any universal joint. The tilting block and the swiveled connection-rod E and block O are preferable. As the construction is simple and the parts more positive in their working, I attach great importance to making the shafts K and K' tubular and connecting them by intermediate gearing with the wheel-shaft, so as to revolve each shaft independent of the other and in opposite directions, as by this arrangement the wheel is kept in the wind, as will be more fully hereinafter set forth, and a tubular casing is provided for the governor-regulating cord, to prevent it entangling with the working parts of the machine, and afford a protection from the weather.

To show how the arrangement of gearing and tubular shafts prevents the wheel creeping out of the wind, suppose that there was only one shaft and one set of miter-wheels, as J I, and the load on the shaft K was heavy, the wheel being brought in the wind and revolved would cause the miter-wheel I to receive a corresponding motion, and as it would require less force to turn the casting B and its various parts about the shaft K than to turn the latter with its load, the former would be revolved about the latter as the casting is journaled or swiveled on the shaft and the miter-wheels I and J are fixed relatively to the casting and shaft, respectively, thus carrying the wheel out of the wind. Such would be the case if only one set of miter-wheels and one shaft were employed; but as two sets of miter-wheels and two concentric shafts are employed and the latter are caused to revolve in opposite directions, the force exerted by each to cause the wheel to creep out of the wind is counterbalanced, and the wheel is kept in the wind and receives a steady and uniform movement.

Having thus described my invention, what I claim, and desire to secure by Letters Patent, is—

1. The combination, in a wind-wheel, of a pivoted vane, a lever pivoted midway of its ends, one of which latter is weighted, an arm pivotally supported at one end, a rod pivoted to the arm midway of its ends and connected to the light end of the weighted lever, a second rod connecting the free end of the arm with the vane, and means, substantially as described, to turn the weighted lever about its pivot, as and for the purposes specified.

2. The combination, with the shaft of the wheel, the main tubular shaft, and the secondary shaft working in the tubular shaft, of the pinion fixed on the main shaft, the pinion of the secondary shaft, the spur-gearing having a miter-gear on its side and fixed on the shaft of the wheel, and the intermediate gear having a side meter-gear and arranged between the spur-gear and the wheel-shaft, and the miter-pinion on the inner or secondary shaft, substantially as set forth.

3. The combination of the pivoted vane, a lever having arms projected laterally therefrom in opposite directions and pivotally supported at the junction of the arms with the lever, an arm pivoted at one end, rods connecting the latter arm with one arm of the weighted lever and with the vane, respectively, and a cord attached to the free arm of the weighted lever and passed over a pulley in line with the bore of the hollow shaft and down through the hollow shaft, substantially as set forth.

4. In a wind-wheel, the combination, with the pivoted vane, the arm D, and the mechanism for operating the arm D, of the tilting block O, pivoted on the arm of the vane, and the rod E, having one end pivoted to the end of the arm D and the other end held in a bearing in the block O, substantially as set forth.

5. The combination, with the frame B, provided with arms $B^6 B^7$, and the vane pivoted between the said arms, of the arm D, pivoted to the frame above the vane, the weighted lever pivoted to the frame below the vane, rods for connecting the weighted lever-arm D and vane, and means for operating the weighted lever, substantially as set forth.

6. The combination, with the wind-wheel shaft, the intermeshing spur-gearing $H^3$ and I, miter-gears $H^4$ and $I^2$, attached, respectively, to the faces of the spur-gears $H^3$ and I, concentric shafts K K', miter-gears J J', keyed, respectively, to said shafts, and facing upward to mesh with the lower side of the miter-gears $H^4 I^2$, and miter-gears L L', keyed to the lower portions of the concentric shafts and faced downward to mesh with the upper side of the miter-gears M M', projecting from the face of intermeshing spur-gears $M^2 M^3$, substantially as and for the purpose specified.

In testimony whereof I affix my signature in presence of two witnesses.

LYMAN U. LOOMIS.

Witnesses:
L. J. MEŸER,
WM. HICKSTUN.